Dec. 2, 1941.  J. F. KOVALSKY  2,264,987
REGULATING APPARATUS
Filed Dec. 21, 1939  2 Sheets-Sheet 2

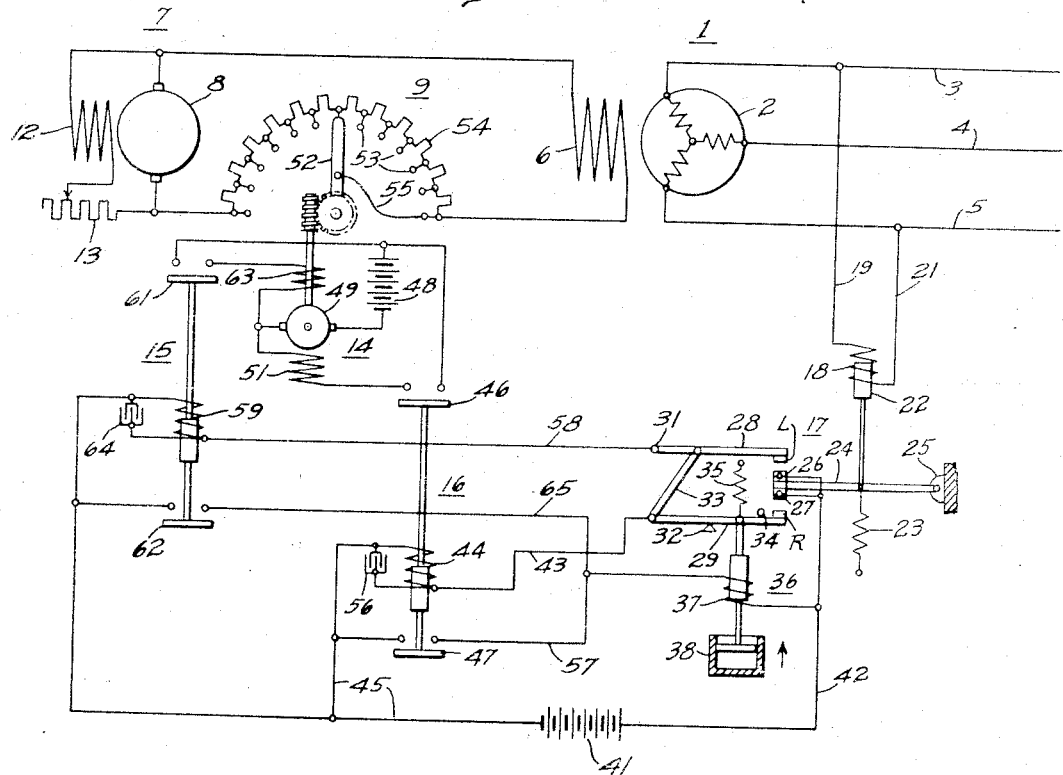

WITNESSES:

INVENTOR
Joseph F. Kovalsky.
BY
Franklin E. Hardy
ATTORNEY

Patented Dec. 2, 1941

2,264,987

UNITED STATES PATENT OFFICE 2,264,987

REGULATING APPARATUS

Joseph F. Kovalsky, Turtle Creek, Pa., assignor to Westinghouse Electric & Manufacturing Company, East Pittsburgh, Pa., a corporation of Pennsylvania Application December 21, 1939, Serial No. 310,409

7 Claims. (Cl. 171—312)

My invention relates to regulators and particularly to regulators of the type in which the regulated quantity is controlled by the operation of a motor.

In regulating apparatus of this type as applied, for example, to the operation of a motor-operated rheostat in the field circuit of an electric generator, or in the field circuit of an exciter supplying current to the field winding of the generator, for controlling the generator voltage, it is the usual practice to provide a contact-making voltmeter or primary relay that is sensitive to the regulated voltage, and which moves a beam or similar element in the one or other direction from a mid or balanced position in accordance with the direction and amount of variation in the regulated quantity from its desired value. The movable contact members are adapted to engage normally stationary contact members through which circuits are closed for controlling the operation of secondary relays, which in turn control the operation of the rheostat motor to vary the field winding excitation. Changes in the generator output voltage occur at short time intervals after changes in the setting of the field controlling rheostat due to the inductance of the generator field winding, so that in order to prevent over-correction in the regulated voltage it is customary to provide an anti-hunting mechanism for interrupting the operation of the rheostat motor prior to the completion of a correction of the regulated voltage. If, therefore, the variation in the regulated voltage is large, the initial operation of the mechanism will be insufficient to complete the correction and the primary relay may cause one or more successive operations of the regulated mechanism, thus effecting a step-by-step correction in the voltage until a sufficient number of operations of the equipment have taken place to effect the necessary correction of the regulated voltage. This step-by-step operating characteristic causes the regulator mechanism to take a considerable time to complete a large correction in the regulated quantity, since the complete correction is effected by a succession of smaller corrections, the operation of the equipment being interrupted between the successive steps.

It is an object of the invention to provide a regulator of the above-indicated character which will effect a correction in the regulated quantity upon a single operation of the equipment for each change in the regulated quantity from its desired value independently of the amount of change thereof, instead of effecting a step-by-step action in which the number of steps of operation vary with the amount of correction required.

A regulator having the operating characteristics indicated will more rapidly correct the regulated quantity, since the time interval between successive operating steps of the mechanism is eliminated, and the duty on the equipment is also reduced because the contact members and relays controlled thereby are brought into operation a lesser number of times.

Other objects and advantages of the invention will be apparent from the following description of a preferred embodiment of the invention, reference being had to the accompanying drawings, in which:

Figure 1 is a simplified diagrammatic view of the essential apparatus and circuits illustrating a conventional regulating equipment;

Fig. 2 is a diagram indicating the operating characteristics of the regulator illustrated in Fig. 1;

Figure 3:
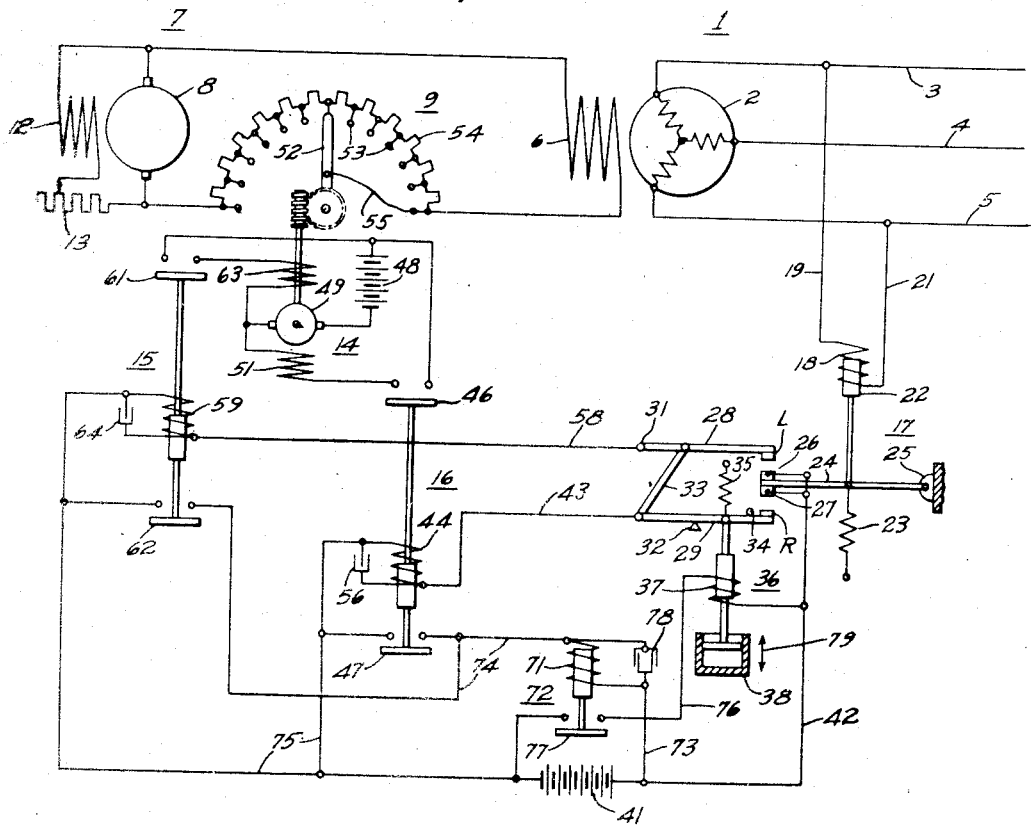
Fig. 3 is a diagrammatic view of apparatus and circuits illustrating an embodiment of the invention.

Referring to Fig. 1, a generator 1 is illustrated having an armature winding 2 connected to supply current to a three-phase circuit comprising conductors 3, 4 and 5 and having a field winding 6 connected to be supplied with energy from an exciter generator 7 having an armature winding 8 that is connected to the field winding 6 through a rheostat 9. The exciter generator 7 is shown as having a self-excited field winding 12 connected across the armature winding 8 through a control resistor 13. The rheostat 9 is actuated by a rheostat motor 14 in accordance with the operation of secondary relays 15 and 16 there are, in turn, controlled by a primary relay 17 having a winding 18, that is connected by circuit conductors 19 and 21 to be energized in accordance with the output voltage of the generator 1. The relay is provided with a core 22 that is biased by the winding 18 against the pull of a spring 23 to control the operation of a contact-carrying lever 24 that is connected to the armature core 22 and to the spring 23 and is mounted to move about the pivot 25. The end of the lever 24 remote from the pivot 25 carries movable contact members 26 and 27 that are adapted to engage normally stationary contact members L and R, respectively, that are carried by levers 28 and 29. The lever 28 is mounted to move about the pivot 31, and the lever 29 is mounted to move about the pivot 32, the two levers being interconnected by a link 33 for effecting simultaneous movements of the levers 28 and 29 in a direction to cause the contact members L and R to move away from each other or toward each other. A stop 34 is provided for limiting the movement of the contact members L and R toward each other. The levers 28 and 29 are subject to the force of a spring 35 and to the force of a magnet 36, the core of which is connected to the lever 29 and is provided with an energizing winding 37 connected in a manner to be later described. A dashpot or similar retarding device 38 is provided for limiting the rate of movement of the electromagnet core in the upper direction, as indicated by the arrow.

When the voltage of the generator 1 is at its desired value, the contact members 26 and 27 float in their illustrated positions between the contact members L and R, and the relays 15 and 16 are in their deenergized or illustrated positions. If the voltage of the generator 1 decreases below the desired value, the energization of the winding 18 and of the core 22 of the primary relay 17 is decreased so that the greater pull of the spring 23 causes engagement of the contact member 27 with the contact member R to close a circuit from the battery 41, through conductor 42, contact members 27 and R, conductor 43, the winding 44 of the relay 16 and conductor 45 to the opposite terminal of the battery 41, causing the relay 16 to be actuated to move the contact members 46 and 47 thereof to their circuit closing positions. The contact member 46 closes a circuit from the battery 48, through the armature winding 49 of the rheostat motor 14 and the field winding 51 to operate the motor 14 in a direction to move the rheostat arm 52 in a counterclockwise direction from engagement with one to engagement with another of the rheostat buttons 53. This movement increases the amount of rheostat resistance 54 that is shunted through the connection 55, thereby decreasing the resistance in the field circuit and increasing the voltage applied to the field winding 6 to correspondingly increase the voltage of the generator 1, and cause the primary relay to again center the contact members 26 and 27 in their illustrated positions. A condenser 56 is provided in shunt relation to the relay winding 44 to maintain the winding energized for a sufficient length of time after separation of the contact members 27 and R to hold the relay 16 in a closed position long enough to permit the motor 14 to move the rheostat arm 52 from one to an adjacent one of the rheostat buttons 53 even though the contact members 27 and R are separated prior to the time necessary for the motor 14 to complete a single step in the operation of the rheostat 9.

Upon operation of the relay 16 to its circuit closing position, the contact member 47 completes a circuit from the battery 41 through conductor 42, winding 37, conductor 57, contact member 47 and conductor 45 to the battery 41 to energize the electromagnet 36 and cause the contact member R to be moved abruptly downwardly or in a direction to separate it from engagement with the contact member 27. Upon the deenergization of the relay 16 and the interruption of the circuit through the contact member 47, the force of the electromagnet 36 decreases permitting the spring 35 to move the levers 28 and 29 and the contact members L and R to their normal or illustrated positions. The action of the dashpot 38 limits the rate of this return of the contact members L and R to their normal positions, so that an appreciable time is permitted for the voltage of the generator 1 to adjust itself to the changed condition caused by operation of the rheostat 9.

If the voltage of the generator 1 increases above its desired value, the pull on the core 22 of the primary relay 17 is increased so that the force exerted by it is greater than the force exerted by the spring 23, thus causing the lever 24 to be moved upwardly and effect engagement of the contact member 26 with the contact member L. A circuit is thus closed from the battery 41, through conductor 42, contact members 26 and L, conductor 58, the winding 59 of the relay 15 and conductor 45 to the battery 41, causing operation of the relay 15 to close circuits through the relay contact members 61 and 62. The movement of the contact member 61 to its circuit closing position completes a circuit from the battery 48 through the motor armature winding 49, field winding 63 and contact members 61 to cause operation of the motor 14 in a direction to move the rheostat arm 52 in a direction to increase the amount of the resistance 54 in circuit with the field winding 6 and decrease the generator voltage. A condenser 64 is shown connected in shunt relation to the relay winding 59 for maintaining the relay in its circuit closing position a sufficient time to permit the motor 14 to operate the rheostat arm 52 from engagement with one rheostat button 53 to engagement with the next adjacent button of the series. The relay contact member 62 closes a circuit from the battery 41, through conductor 42, winding 37 of the electromagnet 36, conductor 65, contact member 62 and conductor 45 to the battery 41, to cause operation of the magnet 36 in the manner above described to move the contact members L and R away from each other, the member L moving in a direction to cause separation of the contact members L and 26 to interrupt the circuit through the relay winding 59 and thus interrupt the operation of the motor 14. The electromagnet 36 operates in the same manner independently of which of the relays 15 or 16 is energized, that is, to effect an abrupt movement of the contact members L and R away from each other upon energization of the winding 37 and permit a gradual movement toward each other upon deenergization of the winding 37 after the secondary relay 15 or 16 has dropped to its illustrated or deenergized position until limited by the stop 34.

Referring to Fig. 2, the time necessary to complete a correction in the generator voltage is shown by the horizontal distance or abscissa of the various points on the curve A—B for varying percentages in variations of the regulated quantity from its desired value. In this curve, it is assumed that each step of the operation of the rheostat 9 causes a half percent correction in the generator voltage. If, for example, the voltage varies from the desired value by ½%, the contact members of the primary relay 17 will effect a one-step operation of the rheostat 9, which takes place during the time indicated by the line 66 in Fig. 2, the horizontal distance beyond the line 66 to the curve A—B representing the time during which the contact members L and R are returning to their normal positions under the delaying influence of the dashpot 38. If the variation in the regulated quantity is 1%, two operations of the rheostat 9 will take place as indicated by two lines 67 in Fig. 2. It will be noted that, as the variation in the regulated quantity from the desired value increases, the duration of time between the first and second operation of the mechanism becomes less. This is because as the position of the primary relay lever 24 is moved further from the balanced position, a lesser movement of the contact members L and R from their extreme separated positions toward their normally stationary positions is required to effect a second engagement of the contact members. As indicated by the lines 68 in Fig. 2 opposite a 3% variation in the regulated quantity, it will be apparent that the first operation of the electromagnet 36 was not sufficient to cause immediate separation of the primary relay contact members.

Referring to Fig. 3 of the drawings, the equipment there disclosed includes the same essential parts as the regulator system disclosed in Fig. 1, namely, the generator 1, exciter generator 7, rheostat 9 controlled by a rheostat motor 14 in accordance with the operation of secondary relays 15 and 16 as controlled by the primary relay 17. The system disclosed in Fig. 3, however, differs from that disclosed in Fig. 1, in that the back contacts 62 and 47 on the secondary relays 15 and 16, respectively, instead of controlling the energization of the winding 37 directly, control the energization of a winding 71 of a timing relay 72, through a circuit from the battery 41, including conductors 73 and 74, the contact member 47 or the contact member 62 and conductor 75. The operation of the timing relay 72 to its circuit closing position in turn closes a circuit through conductor 42, winding 37 of the electromagnet 46, conductor 76, relay contact member 77 to the battery 41. A condenser 78 is connected in shunt relation to the relay winding 71 having a considerable capacity for a purpose to be later explained. The dashpot 38, as indicated by the arrow 79, is effective to retard the movement of the core of the magnet 36 in both directions of travel.

Figure 4:
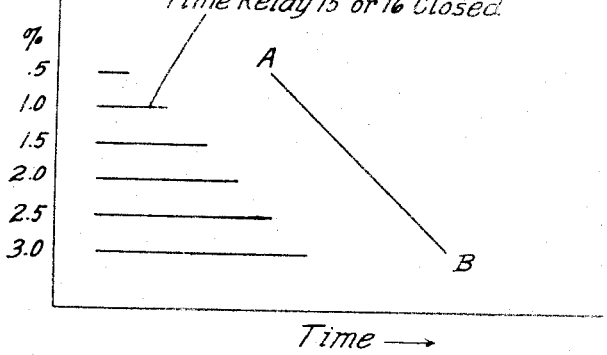
Fig. 4 is a diagram indicating the operating characteristics of the regulator equipment illustrated in Fig. 3.

The regulator system illustrated in Fig. 3 for starting the operation of the motor 14 and the rheostat 9 operates in a manner similar to that illustrated in Fig. 1. Upon movement of the primary relay lever 24 in the one or other direction from its mid or balanced position, the engagement of contacts 26 and L, or 27 and R, closes a circuit to operate the secondary relay 15, or 16, to its circuit closing position to cause operation of the rheostat motor 14 in the one or other direction. Upon the closure of one of the relays 15 or 16, a circuit is closed through the back contact members 62 or 47 to effect operation of the timing relay 72 to its closed position to energize the electromagnet 36. Since, however, the dashpot 38 prevents sudden movement of the core of the magnet 36 and consequently sudden movement of the contacts R and L away from each other, the duration of time during which the primary relay contact members 26 and L, or 27 and R, remain in engagement is increased. From reference to Fig. 2, the total time of operation of the regulator equipment required for effecting correction in the regulated voltage is indicated by the total time during which relays 15 and 16 are closed; that is, the total time represented by total length of the dash lines in Fig. 2 opposite a particular percentage of error value. The electromagnet 36, together with the dashpot 38, may be so designed that the rate of movement of the contact members L and R is such that for any particular percentage variation in the regulated quantity from its desired value, this total time is consumed prior to separation of the primary relay contact members. These values are indicated in Fig. 4 by the continuous horizontal lines opposite the indicated percentage values which represent the percent change in the regulated quantity from its desired value. This causes continuous operation of the motor 14 and rheostat 9 over the number of rheostat steps necessary to complete the correction for any percentage error.

When the electromagnet 36 has moved sufficiently to separate the primary relay contact members, the secondary relay 15, or 16, drops to its open or illustrated position, thus interrupting the operation of the motor 14. At the same time, the circuit through the winding 71 of the timing relay 72 is interrupted. However, in view of the condenser 78 in parallel circuit relation to the winding 71, the deenergization of this winding is retarded long enough to maintain the circuit through the winding 37 of the electromagnet 36 energized until the levers 28 and 29 have reached their extreme outer positions. Upon the deenergization of the timing relay 72, the circuit through the winding 37 is interrupted and the spring 35 starts the movement of the levers 28 and 29 to their normal stationary positions. The time consumed in this operation, as indicated by the horizontal distance between the right-hand ends of the several horizontal lines in Fig. 4 and the line A—B, represents the time interval between the separation of the primary relay contact members and the completion in the adjustment of the voltage of the generator 1 resulting from the operation of the rheostat 9.

This time interval is sufficient to permit the primary relay lever 24 to reach its mid or balanced position before the contact members L and R have returned to their normally fixed positions as limited by the stop 34. The time of operation of the regulator mechanism for completion of the adjustment of the regulated quantity to its desired value is represented for any particular percentage of variation from the desired value represented on Figs. 2 and 4 by the horizontal distance between the ordinate and the curve A—B of these two figures. It will, therefore, be apparent that the apparatus illustrated in Fig. 3 operates to correct the regulated quantity in a much shorter time by, in effect, adding the several step-by-step operations of the equipment shown in Fig. 1 into a single operation of like change in rheostat position, but eliminating the time intervals between successive steps that is characteristic of the equipment shown in Fig. 1.

Modifications in the apparatus and circuits shown within the spirit of my invention will be apparent, and I do not wish to be limited otherwise than by the scope of the appended claims.

I claim as my invention:

1. In a regulating system, in combination, a control relay having contact means positionally responsive to an electrical quantity of the system, and contact means cooperatively related thereto, means responsive to the engagement of said cooperating contact means for controlling said regulated quantity, electromagnetically controlled anti-hunting means controlled by said cooperating contact means for moving said second-named contact means from an initial position in a direction to separate said contact means, means for permitting a gradual movement only of said second-named contact means from or toward its initial position, and means for insuring completion of the movement of said second-named contact means throughout a given range away from said given position before permitting their return thereto.

2. In a regulating system, in combination, a control relay having contact means positionally responsive to an electrical quantity of the system, and contact means cooperatively related thereto and normally biased to a given position, means responsive to the engagement of said cooperating contact means for controlling said regulated quantity, anti-hunting means comprising electroresponsive means energized upon engagement of said contact means for moving said second-named contact means away from said given position in a direction to separate said cooperating contact means, damping means for permitting a gradual movement only of said second-named contact means from or toward its initial position, and means for insuring completion of the movement of said second-named contact means throughout a given range away from said given position before permitting their return thereto.

3. In a regulating system, in combination, a control relay having contact means positionally responsive to an electrical quantity of the system, and contact means cooperatively related thereto and normally biased to a given position, means responsive to the engagement of said cooperating contact means for controlling said regulated quantity, anti-hunting means comprising electroresponsive means energized upon engagement of said cooperating contact means for moving said second-named contact means in a direction away from said first-named contact means, means for delaying the separation of said contact means in accordance with the amount of variation in the electrical quantity from its desired value, and means for insuring completion of the movement of said second-named contact means throughout a given range away from said given position before permitting their return thereto.

4. In a regulator system, in combination, a primary control relay having contact members movable in accordance with variations in an electrical quantity to be regulated and normally stationary cooperating contact members, means controlled by engagement of said contact members for effecting a correction in the regulated quantity, anti-hunting means including a timing relay energized upon the initiation of a corrective action, and electroresponsive means controlled thereby for moving said normally stationary contact members in a direction away from the first-named contact members, and means for delaying the separation of said contact members in accordance with the amount of variation in the regulated quantity from its desired value, said timing relay having a time delay opening characteristic of sufficient duration to permit the above named normally stationary contact members to complete movement throughout a given range away from the first-named contact members before the opening of the relay.

5. In a regulator system, in combination, a primary control relay having contact members movable in accordance with variations in an electrical quantity to be regulated and normally stationary cooperating contact members, means controlled by engagement of said contact members for effecting a correction in the regulated quantity, anti-hunting means including a relay energized upon the initiation of a corrective action and electroresponsive means controlled thereby for moving said normally stationary contact members in a direction away from the first-named contact members, damping means for permitting a gradual movement only of said normally stationary contact members from or toward their normally stationary positions, and means associated with said relay for providing a time delay opening characteristic in the operation of said relay upon interruption of its energizing circuit of sufficient duration to permit the above named normally stationary contact members to complete movement throughout a given range away from the first-named contact members before the opening of the relay.

6. In a regulator system, in combination, a primary control relay having contact members movable in accordance with variations in an electrical quantity to be regulated and normally stationary cooperating contact members, means controlled by engagement of said contact members for effecting a correction in the regulated quantity, anti-hunting means including a relay energized upon the initiation of a corrective action and electroresponsive means controlled thereby for moving said normally stationary contact members in a direction away from the first-named contact members, and means associated with said relay for providing a time delay opening characteristic upon interruption of its energizing circuit of sufficient duration to permit the above named normally stationary contact members to complete movement throughout a given range away from the first-named contact members before the opening of the relay.

7. In a regulator system, in combination, a primary control relay having contact members movable in accordance with variations in an electrical quantity to be regulated and normally stationary cooperating contact members, means controlled by engagement of said contact members for effecting a correction in the regulated quantity, anti-hunting means including a relay energized upon the initiation of a corrective action and electroresponsive means controlled thereby for moving said normally stationary contact members in a direction away from the first-named contact members, means associated with said relay for providing a time delay opening characteristic upon interruption of its energizing circuit, and damping means for permitting a gradual movement only of said normally stationary contact members from or toward their normally stationary positions.

JOSEPH F. KOVALSKY.